(12) United States Patent
Gooch

(10) Patent No.: US 6,384,907 B1
(45) Date of Patent: May 7, 2002

(54) OPTICAL TARGET AND APPARATUS AND METHOD FOR AUTOMATIC IDENTIFICATION THEREOF

(75) Inventor: Richard M Gooch, Surbiton (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/600,993

(22) PCT Filed: Jun. 29, 2000

(86) PCT No.: PCT/GB00/02520

§ 371 Date: Jul. 26, 2000

§ 102(e) Date: Jul. 26, 2000

(87) PCT Pub. No.: WO01/04575

PCT Pub. Date: Jan. 18, 2001

(30) Foreign Application Priority Data

Jul. 8, 1999 (GB) .............................................. 9915880

(51) Int. Cl.⁷ .............................................. G01B 11/26
(52) U.S. Cl. .............................. 356/139.03; 356/152.3; 235/462.04; 235/469
(58) Field of Search .................... 356/139.03, 141.1, 356/141.2, 141.5, 152.3; 700/259; 901/47; 235/462.04, 469; 250/222.1, 557

(56) References Cited

U.S. PATENT DOCUMENTS

| 4,613,942 A | 9/1986 | Chen |
| 4,796,198 A | 1/1989 | Boultinghouse et al. |
| 6,108,612 A | * 8/2000 | Vescovi et al. .............. 702/150 |

FOREIGN PATENT DOCUMENTS

| DE | 4205406 A | 9/1993 |
| DE | 4447117 C | 3/1996 |
| DE | 19733466 A | 2/1999 |
| EP | 0 439 334 A2 | 7/1991 |
| WO | 98/18117 A1 | 4/1998 |

OTHER PUBLICATIONS

Patent Abstracts of Japan vol. 016, No. 256 (P1368), Jun. 10, 1992 & JP 04 060686 A (NEC Corp), Feb. 26, 1992 abstract.
Patent Abstract of Japan vol. 1999, No. 05, May 31, 1999 & JP 11 051615 A (Samsung Electron Co Ltd), Feb. 26, 1999 abstract.

* cited by examiner

Primary Examiner—Thomas H. Tarcza
Assistant Examiner—Fred H Mull
(74) Attorney, Agent, or Firm—Nixon & Vanderhye P.C.

(57) ABSTRACT

An optical target (1) including a positioning sub target (2) for determining position, and a plurality of identifying sub targets (3) for identifying one optical target (1) from another, each of which plurality of identifying sub targets (3) is a different color from the positioning sub target (2).

22 Claims, 4 Drawing Sheets

OPTICAL TARGET AND APPARATUS AND METHOD FOR AUTOMATIC IDENTIFICATION THEREOF

BACKGROUND OF THE INVENTION

1. Field of the Invention

This invention relates to an optical target and apparatus and method for automatic identification thereof, particularly, but not exclusively, suitable for photogrammetry measurement tasks.

2. Discussion of Prior Art

Photogrammetry systems use optical targets attached to an object of interest, and the photogrammetry system is able to determine the two dimensional and three dimensional locations of the targets in order to measure the dimensions of, or position of the object. It is often useful to assign a value or code to each of the targets so as to distinguish the targets from one another. The ability to identify specific targets has particular application in identifying specific objects, determining object orientations, matching measured points to computer aided design (CAD) data and denoting known or control target locations. These capabilities are important where photogrammetry systems are to be embedded in assembly processes and operations. Furthermore, if target identities can be determined in the two-dimensional data, the subsequent determination of three-dimensional co-ordinates is faster, more efficient, and more resistant to errors.

Apparatus to distinguish optical targets from each other are available, but these use optical targets having groupings of various size and shape retro-reflective targets, which are arranged in set geometrical position with respect to each other, positioned around a positioning sub target. Although these schemes enable adequate identification of optical targets, the processing involved can be inefficient and can thus slow down the measurement process. Furthermore, dynamic measurements of target or object velocities for fast moving objects are not practicably possible.

There is therefore a need for a generally improved optical target, together with apparatus and method for automatic identification thereof, which apparatus and method facilitate target identification from two-dimensional data by low level processing.

SUMMARY OF THE INVENTION

According to a first aspect of the present invention there is provided an optical target including a positioning sub target for determining position, and a plurality of identifying sub targets for identifying one optical target from another, each of which plurality of identifying sub targets is a different colour from the positioning sub target.

Preferably the positioning sub target is substantially circular and fabricated from retro-reflective material.

Conveniently the identifying sub targets are each substantially circular and fabricated from retro-reflective material.

Advantageously the identifying sub targets are locatable substantially equi-spaced with respect to one another and substantially co-linear with the positioning sub target.

Preferably there is provided colour filters superimposed upon said identifying sub targets to provide the various colours characterising the identifying sub targets.

Conveniently there is a first filter colour and a second filter colour.

Advantageously the first filter colour is green and the second filter colour is red.

Preferably there are one said positioning sub target and three said identifying sub targets comprising the optical target.

According to a further aspect of the present invention there is provided apparatus for automatically identifying optical targets including light source means operable to project light onto said positioning and identifying sub targets.

Preferably the lights source means includes at least a first light source and a second light source, each of which is a circular array of light emitting diodes.

Conveniently the first light source has a circular array of green light emitting diodes and wherein the second light source has a circular array of red light emitting diodes.

Advantageously there is provided switching means to continuously switch between said first and second light sources.

According to a further aspect of the present invention the apparatus includes measurement means operable to image light reflected from the positioning and identifying sub targets when light is projected thereon from the first light source means.

Preferably the measurement means includes a carrier, at least two imaging devices, each attachable to the carrier, configurable to image the optical target, and each having one of the light sources attachable thereto, a processor in operative association with the imaging devices, and communication links between the imaging devices and the processor for transmitting output signals indicative of the light reflected by the positioning and identifying sub targets.

Conveniently each of the imaging devices is a metrology sensor operable to create digitisable images.

Advantageously there is provided three optical targets.

According to a yet further aspect of the present invention there is provided a method for automatically identifying optical targets including the steps of projecting light from light source means, including at least two light sources, each of which is one of two different colours, onto at least one optical target, which optical target includes a positioning sub target and a plurality of identifying sub targets, which identifying sub targets include colours corresponding to the colours of the light sources, digitally imaging onto measurement means a distribution of light reflected from the optical target, which reflected light is representable as bright pixels on at least two imaging devices forming part of the measurement means, transmitting signals indicative of the distribution of light from the at least two imaging devices means to a processor, and processing the signals, thereby to automatically identify the optical target.

Preferably the projection of light from the light sources includes operating switching means at a desired switching rate so as to continuously switch power between said light sources.

Conveniently the processing of signals includes the steps, for each of the optical targets, of assigning each of the two light source colours a logic value so as to correspondingly represent each bright pixel imaged by the measurement means with a binary value, decoding the signals from each of the two imaging devices into a first and a second array of binary value, which first and second arrays of binary values relate to the first and second imaging devices respectively, and matching elements of the first array with those of the second array so as to identify optical targets between first and second imaging devices.

BRIEF DESCRIPTION OF THE DRAWINGS

For a better understanding of the present invention, and to show how the same may be carried into effect, reference will now be made, by way of example, to the accompanying drawings, in which.

DETAILED DISCUSSION OF EMBODIMENTS

An optical target, and apparatus and method for automatic identification thereof according to the present invention, as shown in FIGS. 1 to 6 of the accompanying drawings, is intended for use in situations where multiple optical targets are affixed to an object, and in which more than one imaging device images the targets in order to measure a condition such as the position and orientation of the object. The accuracy of these measurements is dependent on, among other parameters, the correspondence of the targets between images recorded on said imaging devices, and the present invention accordingly provides a means of identifying targets by groupings of different coloured retro-reflective targets.

Figure 1:
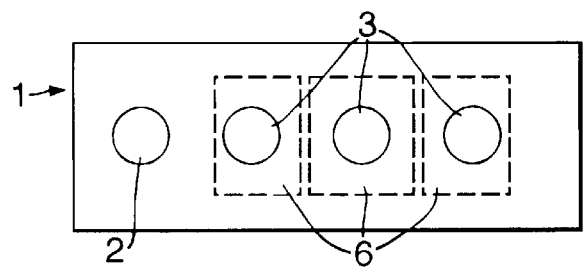
FIG. 1 is a plan view of an optical target according to the present invention.

FIG. 1 of the accompanying drawings show an optical target 1, including a positioning sub target 2 for determining position and a plurality of identifying sub targets 3 for identifying one optical target 1 from another, each of which plurality of identifying sub targets 3 is a different colour from the positioning sub target 2. The optical target 1 preferably includes one positioning sub target 2 and three identifying sub targets 3, and these, together with the positioning sub target 2, are preferably fabricated from retro-reflective material. As shown in FIG. 1, the positioning and identifying sub targets 2, 3, are substantially circular and are locatable substantially equi-spaced and substantially co-linear with respect to one another. FIG. 1 also shows colour filters 6, preferably comprising two colours, green and red, superimposed upon the identifying sub targets 3, thereby providing the various colours characterising the identifying sub targets 3. These colours, green and red, are chosen for illustrative purposes, and it should be understood that any suitable colours could be chosen. Alternative ways of providing the colours include applying coloured paint or pigment to the identifying sub targets 3, or incorporating the desired colours in the material of the identifying sub targets 3 themselves. The positioning sub target does not have a distinct colour, and is thus equally sensitive to all visible wavelengths.

The filters 6 of the present embodiment modulate the intensity of light reflected by the sub targets 3 in accordance with the colour of the light source, such that if the light and the filter are of the same wavelength then the light is reflected efficiently, and the target image is bright. However, if the wavelengths are different, absorption and/or scattering of the light will occur and the light will not be reflected from the sub target 3. Thus the image of the target will be dim, as illustrated in Table 1:

TABLE 1

| | | FILTER COLOUR | | |
|---|---|---|---|---|
| | | Green | Red | None |
| LIGHT COLOUR | Green | Bright | Dim | Bright |
| | Red | Dim | Bright | Bright |

Figure 2:
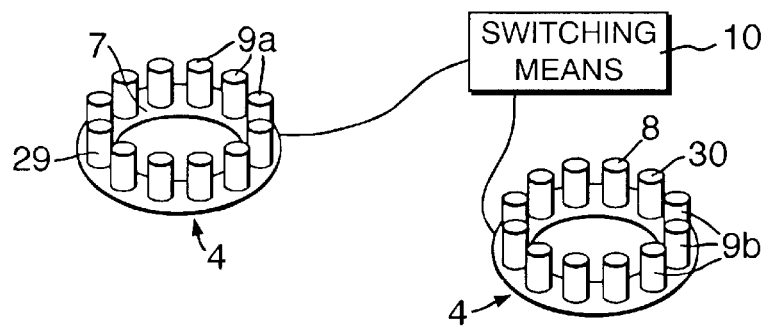
FIG. 2 is a schematic perspective representation of light source means forming part of apparatus for automatically identifying optical targets according to the present invention.

FIG. 2 of the accompanying drawings shows apparatus according to one embodiment of the present invention for automatically identifying optical targets, including light source means 4 in the form of at least two light sources 7, 8 operable to project light onto the positioning and identifying sub targets 2, 3. As shown in FIG. 2 the first light source 7 may comprise an array of green light emitting diodes 9a and the second light source 8 comprises an array of red emitting diodes 9b. As an alternative, the first and second light sources 7, 8 may each comprise an array of green light emitting diodes 9a and red light emitting diodes 9b.

The apparatus also includes switching means 10 which is used to continuously switch between the green and red arrays 9a, 9b thereby to alternately illuminate the identifying sub targets 3 having green and red filters 6 superimposed thereon respectively. For the embodiment shown in FIG. 2 this may be effected by alternately switching power to first and second light sources 7, 8. The positioning sub target 2, being without a filter 6, and thus not discriminatory against any wavelength of light, will be illuminated by both light sources 7, 8, and thus is used for position and orientation measurements of an object to which the optical target 1 is affixed.

Figure 3:
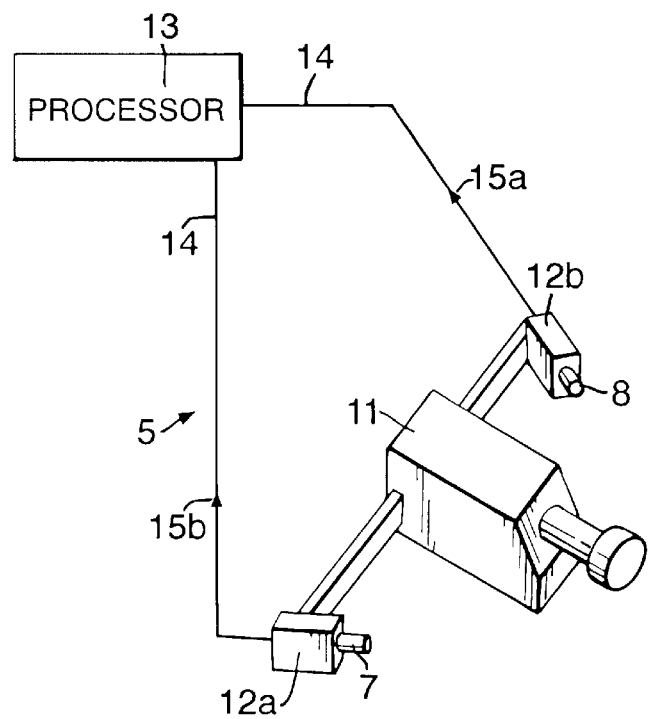
FIG. 3 is a schematic perspective representation of measurement means forming part of apparatus for automatically identifying optical targets according to the present invention.

FIG. 3 of the accompanying drawings shows further features of the apparatus of FIG. 2, including measurement means 5 operable to image light reflected from the positioning and identifying sub targets 2, 3 when light is projected thereon from the light source means 4. The measurement means 5 may include a carrier 11, which for robotic applications will preferably be an end-effector attachable to a robot, and at least two imaging devices 12a, 12b, each of which is attachable to the carrier 11, is preferably a metrology sensor configurable to image the optical target 1 and create digitisable images of light reflected therefrom, and each has one of the first and second light sources 7, 8 attachable thereto. As an alternative to positioning on the carrier 11, and for more general applications, the two imaging devices 12a, 12b may be positioned on tripods (not shown).

The measurement means 5 also includes a processor 13 in operative association with the imaging devices 12a, 12b, and communication links 14 between the imaging devices 12a, 12b and the processor 13 for transmitting output signals 15a, 15b indicative of the light reflected by the positioning and identifying sub targets 2, 3.

The number of unique identities generated by arrangements of identifying sub targets 3 according to the present invention is given by the number of identifying sub targets 3 and the number of colours (given by filters 6) according to the following relationship:

$$I = n^m \tag{1}$$

where I is the number of identities, n is the number of colours and m is the number of sub targets. Thus in the embodiment of n=2, m=3, I=8:

TABLE 2

| | | POSITION OF SUB TARGET | | |
|---|---|---|---|---|
| | | Position 1[1] | Position 2[2] | Position 3[3] |
| IDENTITY | 1 | Red | Red | Red |
| | 2 | Red | Red | Green |
| | 3 | Red | Green | Red |
| | 4 | Red | Green | Green |
| | 5 | Green | Red | Red |
| | 6 | Green | Green | Red |
| | 7 | Green | Red | Green |
| | 8 | Green | Green | Green |

[1]Adjacent sub target 21
[2]Adjacent position 1
[3]Adjacent position 2

Obviously there were three colours and three light sources, the base system would be three, and therefore the base system applied to the present invention is not limited to the disclosed embodiment of two, instead scaling with the number of colours according to Equation 1 above.

Figure 4:
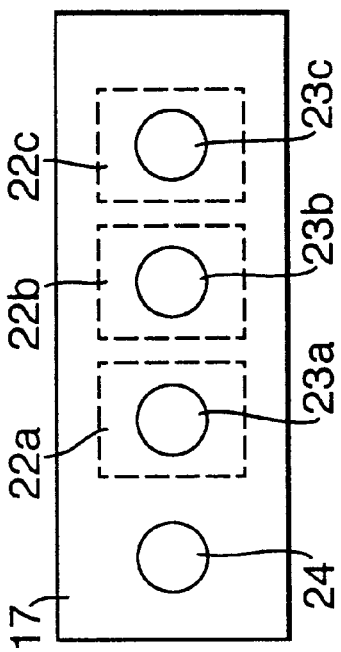
FIG. 4 is a plan view of apparatus according to the present invention showing three optical targets.
Figure 4:
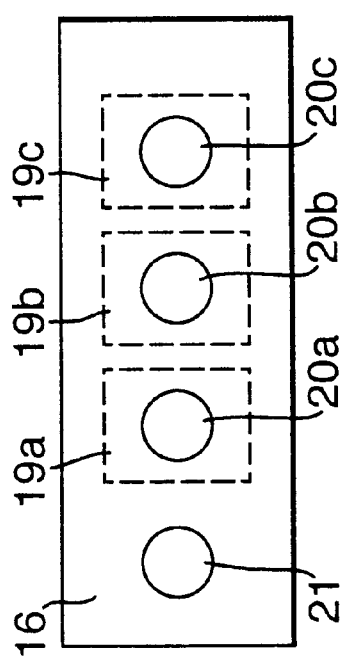
Figure 4:
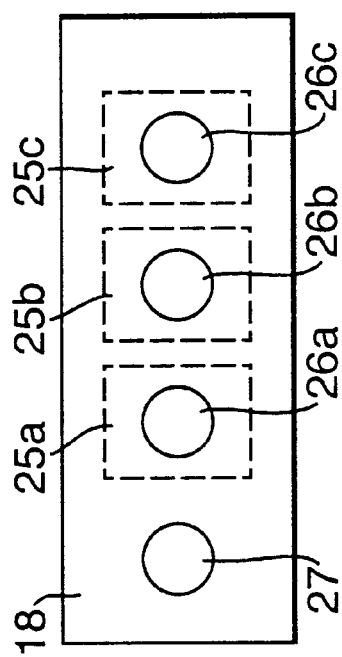

As an example of a selection of the identities presented above in Table 2, FIG. 4 shows an arrangement of three optical targets according to the present invention. These correspond to identities 7, 6 and 4 above, and the three optical targets would typically be placed at known locations on an object whose position and orientation is to be measured.

Thus, in FIG. 4, a first 16 of the three optical targets has a green filter 19a superimposed on a first 20a of the three identifying sub targets, which first identifying sub target 20a is adjacent the positioning sub target 21 of the first optical target 16, has a green filter 19b superimposed on a second 20b of the three identifying sub targets, which second identifying sub target 20b is adjacent the first identifying sub target 20a, and has a red filter 19c superimposed on a third 20c identifying sub target, which third 20c identifying sub target is adjacent the second 20b identifying sub target. A second 17 of the three optical targets has a green filter 19a superimposed on a first 23a of the three identifying sub targets, which first identifying sub target 23a is adjacent the positioning sub target 24 of the second optical target 17, has a red filter 22b superimposed on a second 23b of the three identifying sub targets, which second identifying sub target 23b is adjacent the first identifying sub target 23a, and has a green filter 22c superimposed on a third 23c identifying sub target, which third 23c identifying sub target is adjacent the second 23b identifying sub target. A third 18 of the three optical targets has a green filter 25a superimposed on a first 26a of the three identifying sub targets, which first identifying sub target 26a is adjacent the positioning sub target 27 of the second optical target 17, has a green filter 25b superimposed on a second 26b of the three identifying sub targets, which second identifying sub target 26b is adjacent the first identifying sub target 26a, and has a red filter 25c superimposed on a third 26c identifying sub target, which third 26c identifying sub target is adjacent the second 26b identifying sub target.

The identifying sub targets on each optical target 16, 17, 18 are located substantially equi-spaced with respect to one another and substantially co-linearly with the positioning sub target 21, 24, 27.

Figure 5:
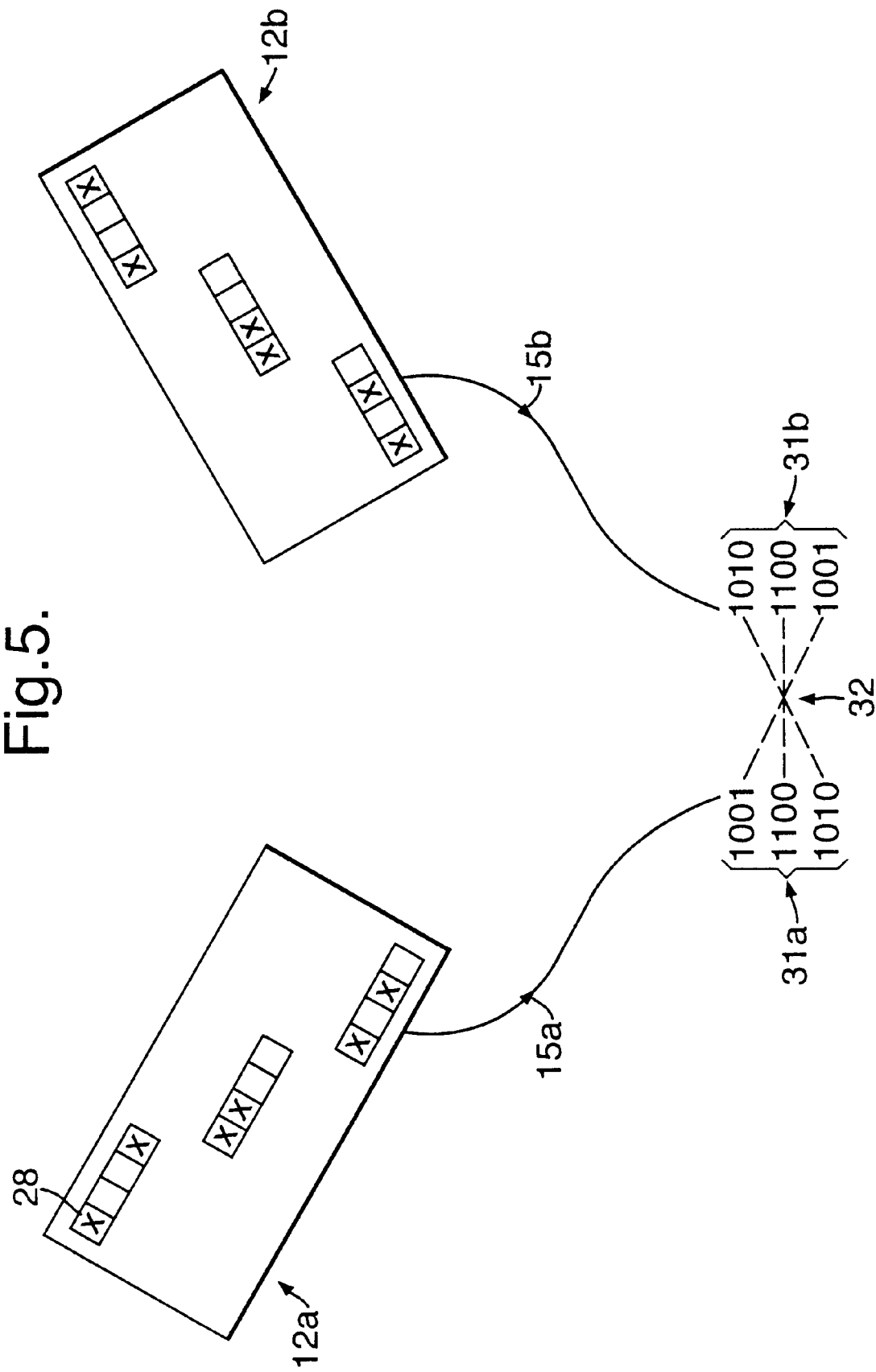
FIG. 5 is a schematic representation of the apparatus of FIG. 3, showing light reflected from the optical targets of FIG. 4 onto imaging devices in a first condition.
Figure 6:
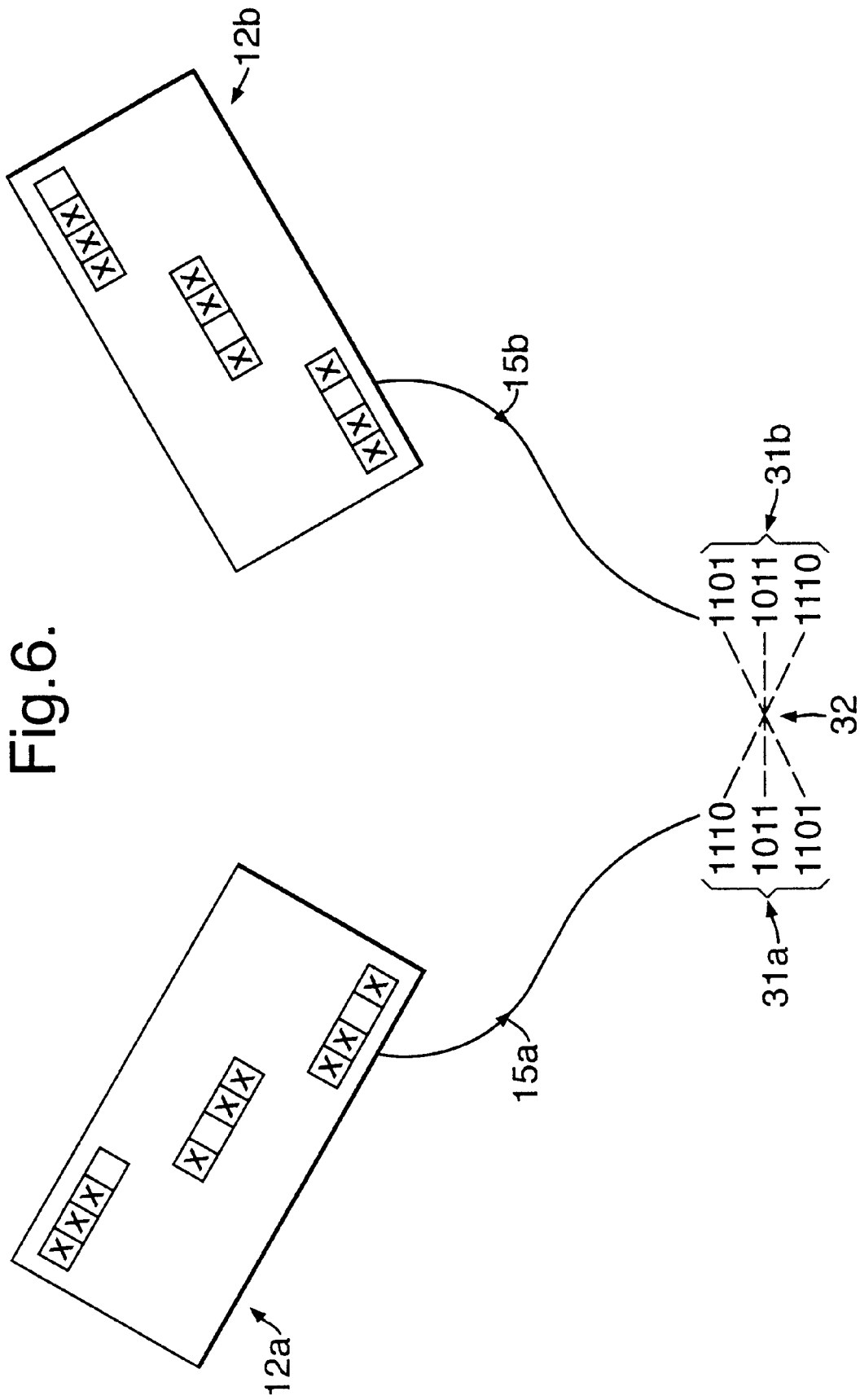
FIG. 6 is a schematic representation of the apparatus of FIG. 3, showing light reflected from the optical targets of FIG. 4 onto imaging devices in a second condition.

The apparatus of the invention, described above, is operable to automatically identify an optical target 1 by implementing a method of the invention, which method includes projecting light from light sources 7, 8, shown in FIG. 3, each of which light sources is one of two different colours, onto optical target 1, which optical target 1 includes a positioning sub target 2 and a plurality of identifying sub targets 3, which identifying sub targets 3 include colours corresponding to the colours of the light sources 7, 8, and digitally imaging onto measurement means 5 a distribution of light reflected from the optical target 1, which reflected light is representable as bright pixels 28, shown in FIGS. 5 and 6, on at least two imaging devices 12a, 12b forming part of the measurement means 5. The projection of light from the light sources 7, 8, is controlled by switching means 10 so as to continuously switch power between the light sources 7, 8 at a desired switching rate, and thus correspondingly illuminate the identifying sub targets 3 on the optical target 1.

The method also includes transmitting signals 15a, 15b indicative of the distribution of light from the at least two imaging devices 12a, 12b to a processor 13, and processing the signals 15a, 15b. FIGS. 5 and 6 show images of the three optical targets 16, 17, 18 of FIG. 4 at imaging devices 12a, 12b and schematically illustrates the transmission and processing thereof in the processor 13. The first step is to assign a logic value 29, 30, indicated in FIG. 2, to each of the two light source colours, so as to correspondingly represent bright pixels 28 imaged by the measurement means 5 with a binary value. Using Table 1 above, the following logic values may be used:

TABLE 3

| | | LIGHT COLOUR | |
|---|---|---|---|
| | | GREEN | RED |
| LOGIC | TRUE (29) | Bright | Dim |
| | FALSE (30) | Dim | Bright |

The distribution of light corresponding to each of the sub targets 2, 3 may cover an array of several pixels, and the pixel or sub-pixel position corresponding to the centre of the digital image thereof may be assigned to the brightest pixel identified in the array, thereby locating each sub target within a single pixel. Once the pixels for each of the sub targets 2, 3 have been identified and the binary values assigned thereto (following, for example, the code in Table 3), the same are decoded to form a numeric identifier for the optical target 1.

The images shown in FIGS. 5 and 6 represent two successive cycles of the switching means, whereby power is sent to the red light emitting diodes 9b then to the green light emitting diodes 9a. Images of the identifying sub targets of the optical targets 16, 17, 18 therefore alternate between bright and dark as they respond to illumination by their corresponding light source 7, 8. This pattern is clearly repeated for the period in which the switching means is in operation. The image recorded by imaging devices 12a, 12b is then transmitted to the processor 13 as output signals 15a, 15b, and these signals 15a, 15b are decoded into a first and a second array of binary values 31a, 31b, having performed the pixel identification described above. The processor 13 then matches 32 the first and second arrays 31a, 31b so as to identify each of the three optical targets 16, 17, 18 between imaging devices 12a, 12b. This process can be performed in real time and as an integral part of any measurements to be performed, such that once the optical targets 16, 17, 18 have been identified, the positioning sub targets 21, 24, 27 thereon are used to perform desired measurement tasks.

The method and apparatus described above can be utilised to perform real time measurements of a series of part movements, such as measurements of movements from position $P_1$ to position $P_2$, around a factor twenty times faster than known systems. This is because the processing described above can be performed while measurements are being performed, and thus the vector describing the movement between positions $P_1$ and $P_2$ at time $t_1$ and time $t_2$, which vector defines the part movement, can be deduced quickly.

What is claimed is:

1. An optical target including:
    a positioning sub target for determining position of such optical target, and
    a plurality of identifying sub targets for identifying one optical target from another, each of said plurality of identifying sub targets is a different colour from the positioning sub target and at least one of said positioning sub target and said plurality of identifying sub targets includes a retro-reflective material.

2. A target according to claim 1, wherein the positioning sub target is substantially circular.

3. A target according to claim 1, wherein the identifying sub targets are each substantially circular.

4. A target according to claim 3, wherein the identifying sub targets are locatable substantially equi-spaced with respect to one another and substantially co-linear with the positioning sub target.

5. A target according to claim 4, including colour filters superimposed upon said identifying sub targets to provide the various colours characterising the identifying sub targets.

6. A target according to claim 5, wherein there is a first filter colour and a second filter colour.

7. A target according to claim 6, wherein the first filter colour is green and the second filter colour is red.

8. A target according to claim 7, having one said positioning sub target and three said identifying sub targets comprising the optical target.

9. Apparatus for automatically identifying optical targets according to claim 1, including light source means operable to project light onto said positioning and identifying sub targets.

10. Apparatus according to claim 9, wherein the lights source means includes at least a first light source and a second light source, each of which is a circular array of light emitting diodes.

11. Apparatus according to claim 10, wherein the first light source has a circular array of green light emitting diodes and wherein the second light source has a circular array of red light emitting diodes.

12. Apparatus according to claim 11, including switching means to continuously switch between said first and second light sources.

13. Apparatus according to claim 9, including measurement means operable to image light reflected from the positioning and identifying sub targets when light is projected thereon from the first light source means.

14. Apparatus according to claim 13, wherein the measurement means includes a carrier,
    at least two imaging devices, each attachable to the carrier, configurable to image the optical target, and each having one of the light sources attachable thereto,
    a processor in operative association with the imaging devices, and
    communication links between the imaging devices and the processor for transmitting output signals indicative of the light reflected by the positioning and identifying sub targets.

15. Apparatus according to claim 14, wherein each of the imaging devices is a metrology sensor operable to create digitisable images.

16. Apparatus according to claim 15, having three optical targets.

17. A method for utilising the apparatus of claim 9, including the steps of
    projecting light from light source means, including at least two light sources, each of which is one of two different colours, onto at least one optical target, which optical target includes a positioning sub target and a plurality of identifying sub targets, which identifying sub targets include colours corresponding to the colours of the light sources,
    digitally imaging onto measurement means a distribution of light reflected from the optical target, which reflected light is representable as bright pixels on at least two imaging devices forming part of the measurement means,
    transmitting signals indicative of the distribution of light from the at least two imaging devices means to a processor, and
    processing the signals, thereby to automatically identify the optical target.

18. A method according to claim 17, in which the projection of light from the light sources includes operating switching means at a desired switching rate so as to continuously switch power between said light sources.

19. A method according to claim 18, in which the processing of signals includes the steps, for each of the optical targets, of
    assigning each of the two light source colours a logic value so as to correspondingly assign a pixel imaged by the measurement means with a binary value,
    decoding the signals from each of the two imaging devices into a first and a second array of binary values, which first and second arrays of binary values relate to the first and second imaging devices respectively, and
    matching elements of the first array with those of the second array so as to identify optical targets between first and second imaging devices.

20. A target according to claim 1, wherein the positioning sub target is comprised of a retro-reflective material.

21. A target according to claim 1, wherein at least one of the identifying sub targets is comprised of a retro-reflective material.

22. A target according to claim 1, wherein the positioning sub target and at least one of the identifying sub targets are both comprised of a retro-reflective material.

* * * * *